United States Patent [19]
Araie et al.

[11] Patent Number: 5,523,953
[45] Date of Patent: Jun. 4, 1996

[54] METHOD AND APPARATUS FOR CORRECTING POSITIONING ERRORS ON A MACHINE TOOL

[75] Inventors: Ichiro Araie, Sakai-gun; Osamu Akemura, Yokohama both of Japan

[73] Assignee: Sodick Co., Ltd., Yokohama, Japan

[21] Appl. No.: 301,382

[22] Filed: Sep. 7, 1994

[30] Foreign Application Priority Data

Sep. 7, 1993 [JP] Japan .................................. 5-246450

[51] Int. Cl.6 .................................................. G05B 19/404
[52] U.S. Cl. ................................ 364/474.35; 364/474.04; 395/21; 395/904
[58] Field of Search ........... 364/167.01, 474.01–474.37; 395/21–23, 904

[56] References Cited

U.S. PATENT DOCUMENTS 4,392,195  7/1983  Inoue .................. 364/474.04
5,259,064  11/1993  Furuta et al. ............. 395/22

FOREIGN PATENT DOCUMENTS 0138375   4/1985  European Pat. Off. .
0406574   1/1991  European Pat. Off. .
3221381  12/1983  Germany .
60-20839  2/1985  Japan .
61-131854  6/1986  Japan .
61-297057  12/1986  Japan .
2-41848   2/1990  Japan .
6-8107    1/1994  Japan .................. 364/474.35

Primary Examiner—Roy N. Envall, Jr.
Assistant Examiner—Steven R. Garland
Attorney, Agent, or Firm—Marks & Murase

[57] ABSTRACT

A machine tool having a tool member which is moveable along at least one axis relative to a workpiece to be machined, comprising thermosensors for sensing temperatures of a plurality of components of the machine tool. Responsive to the sensed temperatures, neural networks infer thermal deformations of the machine components. Based on the inferred values of thermal deformations, a correction signal is obtained which is combined with a drive signal for moving the tool member and/or workpiece to correct for any positioning error in the direction of the axis. Thermal deformations of machine components should be suitably inferred under the circumstances prevailing where the machine tool is installed. A corresponding method of correcting thermal deformations in a machine tool is also described.

20 Claims, 9 Drawing Sheets

METHOD AND APPARATUS FOR CORRECTING POSITIONING ERRORS ON A MACHINE TOOL

FIELD OF THE INVENTION

The present invention relates to a machine tool for cutting, shaping, grinding, boring or polishing a workpiece by displacing a machining tool relative to the workpiece. More specifically, the present invention relates to a machine tool equipped with a control system capable of correcting positioning errors due to thermal deformation(s) of a machine component(s).

BACKGROUND OF THE INVENTION

In many cases, machine tools for cutting, shaping, grinding, boring or polishing a workpiece, especially a metal workpiece, into a desired shape or contour, require precisely accurate positioning of a moveable element such as the tool member of the machine tool and/or the workpiece being machined. In such cases, the workshop is usually maintained at a constant temperature, for example, by means of an air conditioner, to prevent thermal deformations, such as might result from the thermal expansion and/or contraction of machine tool components. Nevertheless, the body of the machine tool may be wholly or partly affected by heat emitted by other machines installed nearby and/or by variations in outside temperature. Further, the machine tool body itself may have heat emitting parts which cause thermal deformations of other components of the machine tool, which in turn may result in an error in positioning a moveable element.

It is difficult to accurately estimate and correct positioning errors from such causes, especially when the potential exists for the thermal deformation of a plurality of machine tool components, which will typically include such items as a bed, a column, and/or a head, since any cumulative positioning error will depend on the magnitude of thermal deformation of each such component which will, in turn, depend on the size and material of the various components, and the direction of thermal deformation, which may be different for different components.

SUMMARY OF THE INVENTION

It is an object of the present invention to provide a machine tool having a control system for accurately correcting positioning errors due to thermal deformations of machine components when positioning a moveable element of the machine tool such as the tool member and/or the workpiece to be machined.

It is another object of the present invention to provide a machine tool having a control system capable of inferring thermal deformations of machine tool components based on temperatures of machine components appropriately sensed in accordance with the circumstances of a particular installation.

It is yet another object of the invention to provide a method of correction for positioning errors in machine tools which include components subject to thermal deformations.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, a machine tool for machining a workpiece into a desired contour is provided, the machine tool including a tool element or member which is moveable relative to the workpiece and a numerical controller which produces a drive signal for moving the tool member relative to the workpiece along at least one axis of movement, and thermosensors for sensing temperatures of a plurality of those components of the machine tool from which thermal deformation(s) may cause a positioning error of the tool relative to the workpiece in the direction of the axis of movement. The machine tool further comprises an inferring section which includes a plurality of neural networks, each of which receives temperature signals indicative of the sensed temperatures and which provides inferred values of thermal deformations of the machine tool components in the direction of the axis of movement, and a correction value calculator for providing a correction signal, indicative of a correction value in the direction of the axis of movement, based on the inferred values of thermal deformations so that the numerical controller can correct any positioning error along said axis due to thermal deformations, for example, by combining the drive signal and the correction signal.

In addition, a machine tool for machining a workpiece into a desired contour is provided, the machine tool including a tool element which is moveable relative to the workpiece, and a numerical controller which produces a drive signal for moving the tool member relative to the workpiece along at least one axis of movement, and thermosensors positioned at selected positions on the machine tool for sensing a plurality of temperatures of various components of the machine tool. The machine tool further comprises an inferring section including a neural network which receives temperature signals indicative of the sensed temperatures and provides a signal indicative of a positioning error of the tool member relative to the workpiece in the direction of the axis of movement, and a correction value calculator for providing a correction signal indicative of a correction value, in the direction of the axis of movement, based on the inferred positioning error so that the numerical controller can correct any positioning error arising from temperature variations, for example, by combining the drive signal and the correction signal.

Further, there is provided a method of correcting for positioning errors between a workpiece and a tool member in a machine tool, the machine tool including a plurality of components subject to thermal deformation, wherein the tool member and workpiece are adapted to move relative to each other along at least one axis of movement under control of a drive signal from a numerical controller. The method comprises sensing the temperatures of a plurality of positions of the machine tool, and inputting the sensed temperatures to at least one neural network having a plurality of neurons. Signals indicative of thermal deformation along at least one axis associated with the sensed temperatures are input to the neural network to thereby preset bonding strengths between the neurons, thereby associating the sensed temperatures and the thermal deformations. Thereafter, thermal deformations along at least one axis are inferred, based on the sensed temperatures and on the preset bonding strengths, and a thermal deformation correction value is generated. Based upon the thermal deformation value, any positioning errors due to thermal deformations are corrected.

BRIEF DESCRIPTION OF THE DRAWINGS

The accompanying drawings, which are incorporated in and form a part of the specification, illustrate a presently preferred embodiment of the present invention and, together with the description, serve to explain the principles of the invention. In the drawings.

DETAILED DESCRIPTION OF THE PREFERRED EMBODIMENTS

An embodiment of the invention is described hereinafter in detail with reference to the drawings.

Figure 1:
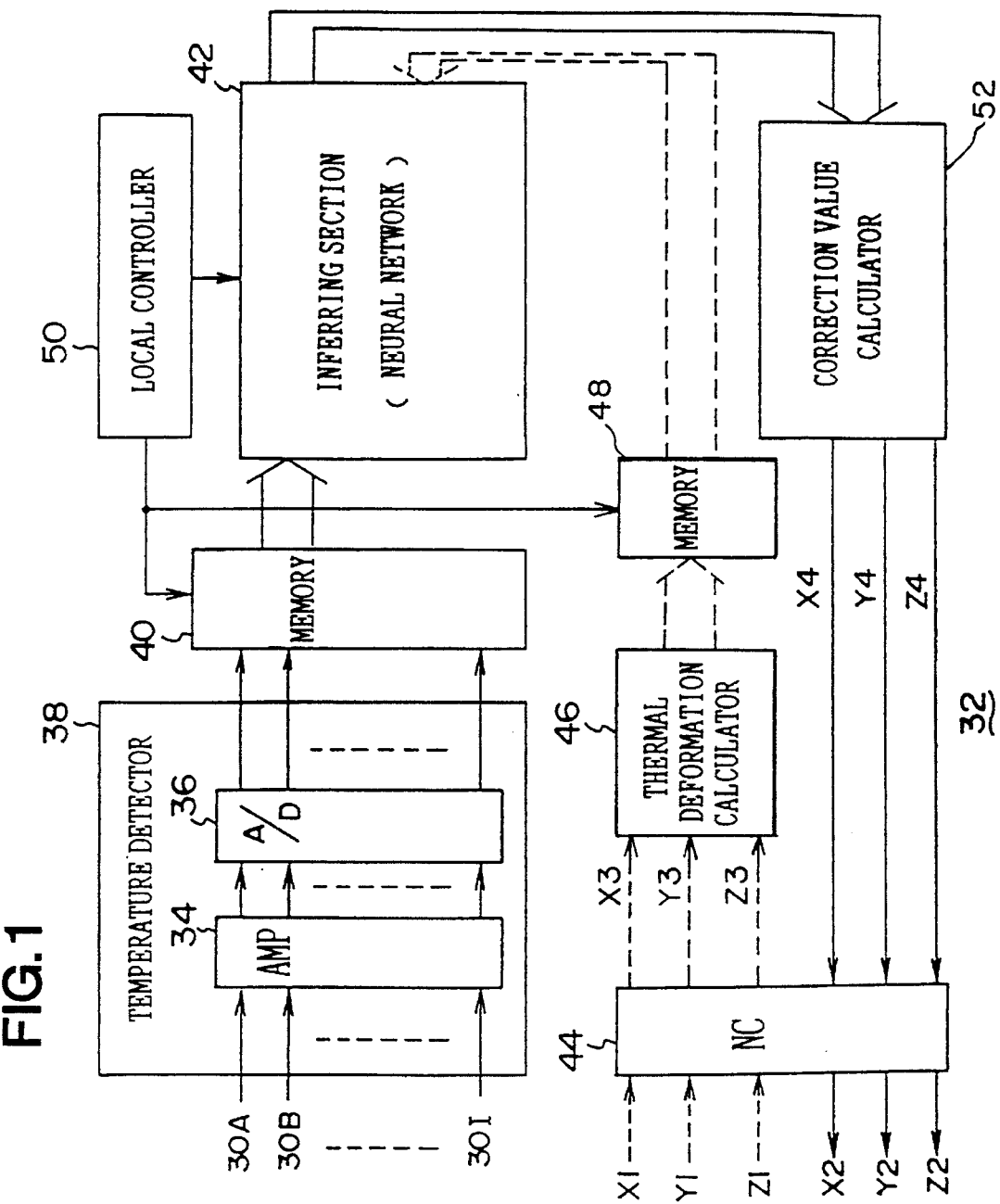
FIG. 1 is a block diagram illustrating a control system of a machine tool embodying the present invention.
Figure 2:
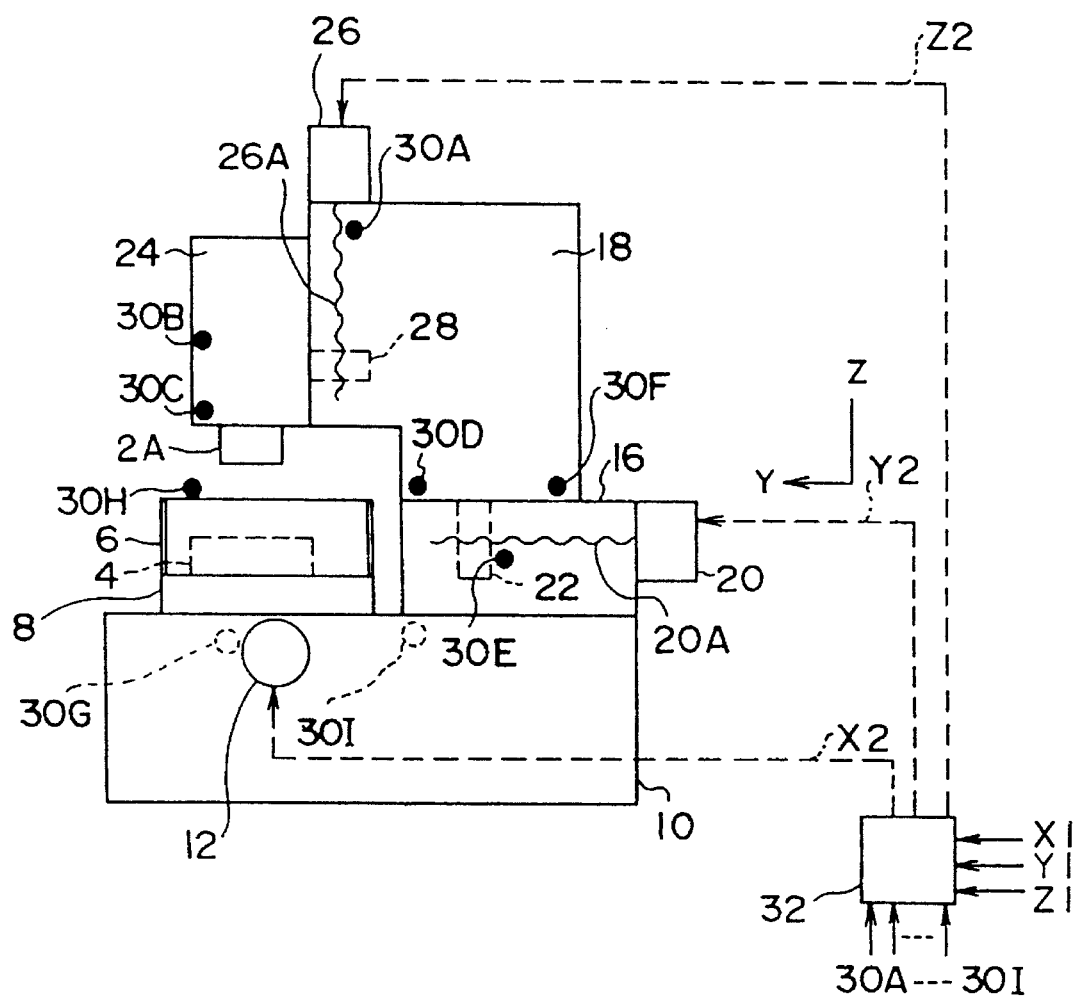
FIG. 2 is a schematic illustration of a side view of a machine tool body having the control system of FIG. 1.
Figure 3:
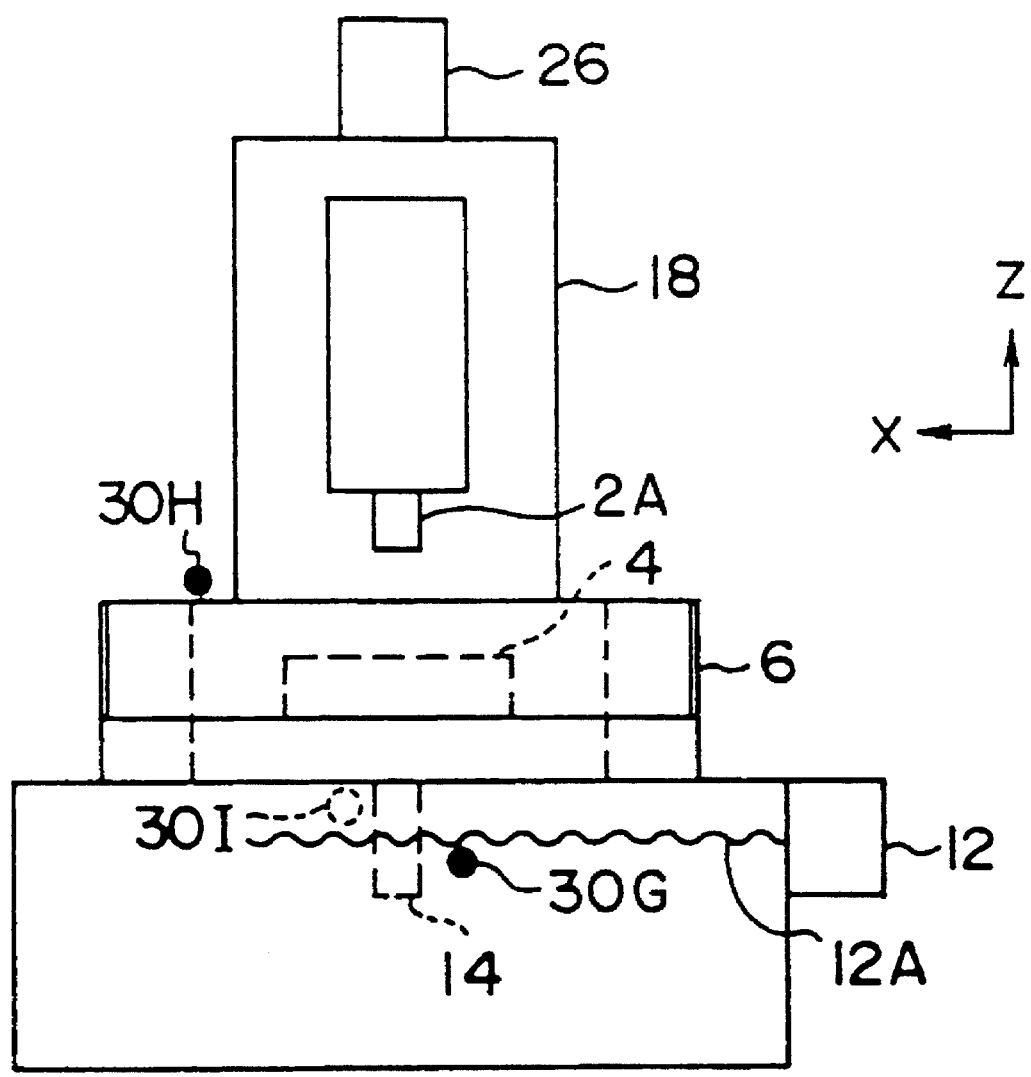
FIG. 3 is a schematic illustration of a front view of the machine tool body of FIG. 2.

FIG. 1 is a block diagram illustrating a control system of a machine tool. FIG. 2 is a schematic illustration of a side view of the machine body of a machine tool. FIG. 3 is a schematic illustration of a front view of the machine body of FIG. 2.

Turning first to FIGS. 2 and 3, there is depicted, as an example of a machine tool with which the present invention may be employed, an electric discharge machine for machining an electrically conductive workpiece using a tool electrode by means of electric discharges induced in a spacing between the workpiece and the tool electrode. This electric discharge machine has construction features which are typical of a machine tool and which include, for example, a bed 10, a column 16, a ram 18 and a servo head 24.

Those exemplary features pertinent to the present invention will now be described. The column 16 is provided on bed 10. An X-axis table 8 is slidably positioned on bed 10 in front of column 16. A work tank 6 is positioned, for example, on the X-axis table 8, and contains therein a dielectric fluid used during machining. The workpiece 4 is securely mounted on an appropriate work table which is fixed on the X-axis table 8. As best seen in FIG. 3, an X-axis ball screw 12A, equipped with a nut 14, is fixedly secured on the bed 10. The nut 14 threadingly engages the X-axis ball screw 12A and is coupled to the X-axis table 8. The X-axis ball screw 12A is rotated by an X-axis drive motor 12 so as to longitudinally move the X-axis table 8, on which the workpiece 4 is secured, in the X-axis direction. A drive signal X2 from a control system 32 is applied to the X-axis drive motor 12. The X-axis drive motor 12 is equipped with a position detector, such as an encoder, which senses its angular displacement and provides an encoder signal X1 indicative of the sensed displacement to the control system 32.

The ram 18 is slidably moveable on the column 16. A Y-axis ball screw 20A, equipped with a nut 22, is secured to the column 16. The nut 22 threadingly engages the Y-axis ball screw 20A and is coupled to the ram 18. The Y-axis ball screw 20A is rotated by a Y-axis drive motor 20 to longitudinally move the ram 18 in the Y-axis direction.

The servo head 24 is slidably moveable on the ram 18 in the Z-axis direction, which is orthogonal to a plane defined by the X- and Y-axes. In the illustrated embodiment, a Z-axis ball screw 26A, equipped with a nut 28, is secured to an upper end of the ram 18 near the front thereof. The nut 28 threadingly engages the Z-axis ball screw 26A and is coupled to the servo head 24. The Z-axis ball screw 26A is rotated by a Z-axis drive motor 26 to longitudinally move the servo head 24 in the Z-axis direction.

In a manner similar to the X-axis drive motor 12, the Y-axis and Z-axis drive motors 20 and 26, respectively, are also equipped with position detectors such as encoders, which provide encoder signals Y1 and Z1, respectively, to the control system 32, which applies drive signals Y2 and Z2 to the Y-axis and Z-axis drive motors 20 and 26, respectively.

A holder chuck 2A is provided on the lower end of the servo head 24 for securing a tool holder (not illustrated) in which a tool electrode (not illustrated) is rigidly mounted. As is typical of RAM-type EDM machine tools, the tool electrode advances from above toward the workpiece 4 which is contained within the work tank 6 which, in turn, is filled with a dielectric fluid whereby electric discharges may be induced in the gap or spacing between the tool electrode and the workpiece when a train of power pulses from an appropriate power source (not illustrated) are applied across the gap.

In the illustrated embodiment, nine thermosensors 30A–30I are positioned on or near various components of the machine tool body. The thermosensors 30A, 30E and 30G are positioned near the Z-axis ball screw 26A, the Y-axis ball screw 20A, and the X-axis ball screw 12A, respectively. The thermosensor 30B is preferably positioned at approximately the middle (in the vertical direction) of the servo head 24 and the thermosensor 30C is preferably positioned at or near the lower end of the servo head 24. The thermosensor 30D is preferably positioned at or near the lower front of the ram 18 and the thermosensor 3OF is preferably positioned at or near the lower end of the back portion of the ram 18. The thermosensor 30H is preferably positioned slightly above the work tank 6, and the thermosensor 30I is preferably positioned at about the middle of the bed 10 in the X-axis direction and under the column 16.

As best seen in FIG. 1, the sensed temperatures from the thermosensors 30A–30I are supplied to the control system 32. The control system 32 is computerized, preferably by means of a number of microprocessors.

The control system 32 includes a temperature detector 38 and a memory 40. The temperature detector 38 has an amplifier 34 for amplifying temperature values from the thermosensors 30A–30I, and an analog-to-digital converter 36 for converting the output signals from the amplifier 34 to digital signals. The memory 40, which may for example comprise a RAM, receives and stores the outputs of the analog-to-digital converter 36.

The control system 32 further includes a numerical controller 44, which furnishes drive signals X2, Y2 and Z2 to the X-, Y- and Z-axes drive motors 12, 20 and 26, respectively, in accordance with a prescribed program to cause displacement of the workpiece 4 and/or of the tool electrode relative to the other along the X-, Y- and Z-axes. The drive signals, X2, Y2 and Z2, indicative of required angular displacements of the various motors, are applied to the drive motors from the numerical controller 44 and then the encoder signals X1, Y1 and Z1, indicative of actual angular displacements of motors X-, Y- and Z-drive motors, respectively, are fed back to the numerical controller 44. By using the encoder signals, the numerical controller 44 controls the drive signals so that the required displacements and the actual displacements are in agreement. The numerical controller 44 is a well-known device requiring no further description.

The control system 32 further includes a thermal deformation calculator 46, a memory 48, an inferring section 42 and a local controller 50. The thermal deformation calculator 46 receives error signals X3, Y3 and Z3, which indicates positioning errors in the X-, Y- and Z-axes directions, respectively, in order to calculate thermal deformations of various machine components. The positioning errors are sensed at given time intervals during room temperature changes. The memory 48, which may for example comprise a RAM, receives and stores the output signals from the thermal deformation calculator 46, which are indicative of thermal deformations of various machine components related to the sensed temperatures.

The inferring section 42 preferably includes a plurality of neural networks, each of which in turn preferably includes a number of "layers", including an input layer for receiving signals from an external neural network and an output layer for providing signals to an external neural network. All of the layers are preferably independent of each other, and each preferably receives signals only from a preceding layer and includes neurons, all of which execute nonlinear signal processing. According to the bonding strength between neurons, which can be adaptively changed by learning, an input signal is weighted.

The temperature signals from the memory 40, which are indicative of detected temperatures, are supplied to the input layers of the inferring section 42. Further, signals indicative of thermal deformations of machine components related to temperature changes are supplied to the output layers of the inferring section 42 as teaching signals. Based on the temperature signals and preset bonding strengths between neurons, output signals are obtained in the output layers of the inferring section 42. These output signals are compared with the respective teaching signals. The inferring section 42 corrects the bonding strengths between neurons so that the output signals obtained in the output layers will agree with the teaching signals. The inferring section 42 repeatedly carries out this learning protocol.

When displacing a tool electrode relative to the workpiece 4, the inferring section 42 infers the thermal deformations of machine components based on sensed temperatures using the neural networks with the "corrected" bonding strengths between neurons. The inferring section 42 provides the inferred thermal deformations of machine components to a correction value calculator 52. Based on these inferred thermal deformation values, the correction value calculator 52 calculates correction values along X-, Y- and Z-axes. The signals X4, Y4 and Z4, indicative of the correction values along X-, Y- and Z-axes, respectively, are output by the correction value calculator 52 to the numerical controller 44. The numerical controller 44 incorporates the correction signals X4, Y4 and Z4, respectively, into the drive signals X2, Y2 and Z2 to thereby correct for positioning errors along X-, Y- and Z-axes due to thermal deformations.

Operation of the machine tool, which can generally be divided into a three-part process, will now be described.

The first part of the process is to measure and store thermal deformations of various machine components and the temperatures of the machine components which are sensed at the time when the thermal deformations are measured.

The second part of the process is to carry out the learning processes for the neural networks in the inferring section 42 by means of appropriate software based on the temperature data and the measured thermal deformations to create neural networks which have correctly learned to associate temperature data with measured thermal deformations.

The third part of the process is to take the measured temperature data of the various machine tool components, supply it to the inferring section 42, and then utilize the "educated" neural networks to infer thermal deformation(s) of the machine components, in order to generate appropriate correction values (if any) for the X-, Y- and Z-axes.

In connection with an exemplary machine tool embodiment, measurement of thermal deformations which cause a positioning error along a Z axis will now be described.

Figure 10:
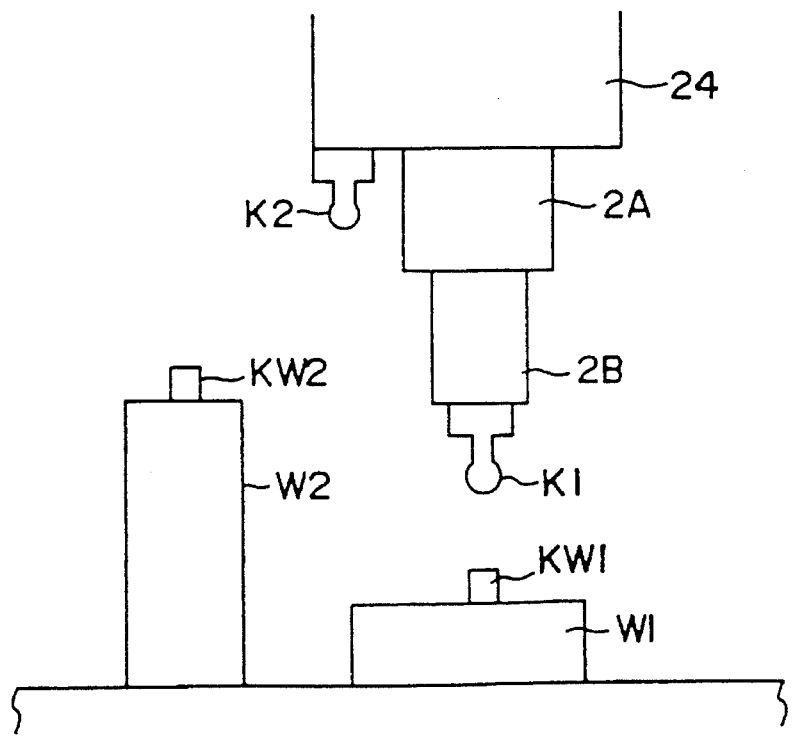
FIG. 10 is a schematic view illustrating the locations of measuring electrodes and pins.

FIG. 10 is a schematic illustration of the locations of measuring electrodes and pins for measuring thermal deformations in the direction of the Z axis. A measuring electrode K1 is mounted on a tool holder 2B, which is rigidly attached on a holder chuck 2A. The holder chuck 2A is provided on the servo head 24. It is preferable that the other measuring electrode K2 be positioned on the same level as the nut 28 of the Z-axis ball screw 26A (see FIG. 2). For illustrative purpose, the measuring electrode K2 is shown on the lower end of the servo head 24. Workpieces W1 and W2 are securely mounted on an appropriate work table. Measuring pins KW1 and KW2 are attached on the workpieces WI and W2, respectively.

The temperatures of each machine component are stabilized in a room temperature regulated to about 21° C. Then, the following data collection is carried out using the machine tool, i.e., with the power on. First, the electrode K1 is aligned with the center of the pin KW1 and contact is made between the electrode K1 and the pin KW1. This contact position is defined as datum point D1.

Second, in the same manner, the electrode K1 is aligned with the center of the pin KW2, and contact between the electrode K1 and the pin KW2 is made. This contact position is defined as datum point D2.

Third, in the same manner, the electrode K2 is aligned with the center of the pin KW2 and contact between the electrode K2 and the pin KW2 is made. This contact position is defined as datum point D3.

The temperatures sensed by the nine (exemplary) thermosensors 30A–30I at the time of the data collection are supplied to the temperature detector 38. The sensed temperatures are amplified in the amplifier 34 and converted to digital signals in the analog-to-digital converter 36. The digital signals are supplied to and stored in the memory 40.

After expiration of a given time interval, for example two minutes, the data collection is carried out again.

The numerical controller 44 supplies an error signal Z3, which represents the differences between the datum points from the first round of data collection and the datum points from the second round of data collection, to the thermal deformation calculator 46. The thermal deformation calculator 46 calculates the thermal deformations of machine components, which are stored in the memory 48. The memory 40 stores detected temperatures during the second round of data collection.

At given time intervals, for example two minutes, this data collection procedure is repeated while temperatures and positioning errors are stored in the memory 40 and the memory 48 until the positioning errors become constant.

Next, an example of a calculation of the thermal deformation calculator 46 will be described. Here, as an example, thermal deformations of machine components which result in a positioning error in the Z-axis direction will be calculated, since positioning in the Z-axis direction is subject to the most complicated thermal deformations.

First, the deformation ($\Delta L$) of the Z-axis ball screw 26A is obtained using the following relationship:

$$(\Delta L) = \eta \cdot \Delta T \cdot L$$

Here, $\eta$ is thermal coefficient of expansion of the ball screw and $\Delta T$ is a temperature rise above an initial temperature. The thermal deformation calculator 46 calculates the temperature rise $\Delta T$ using initial temperature data and current temperature data from the memory 40. L is equal to the length of the ball screw from the fixing part, i.e., the length from where the Z-axis ball screw 26A is secured to the ram 16, to the position of the nut 28.

Second, the deformation ($\Delta H$) of the head part, along the distance from the position of the nut 28 to the lower end of the electrode K1, is obtained using the following relationship:

$$(\Delta H) = P2 - P3 - \Delta L2 + \Delta L3$$

Where P2 is the deformation of the datum point D2 from its initially defined position and P3 is the deformation of the datum point D2 from its initially defined position, $\Delta L2$ represents the thermal deformation of the ball screw 28A when the electrode K1 contacts the pin KW2. $\Delta L3$ represents the thermal deformation of the ball screw 28A when the electrode K2 contacts the pin KW2.

Third, a deformation ($\Delta C$) of the column part, including the ram 18 and the column 16, is obtained using the following relationship:

$$(\Delta C) = \frac{\Delta L1 + (P1 - P3 - \Delta L1 + \Delta L3)}{(W1/W2 - 1) - P2}$$

Where P1 is the deformation of the datum point D1 from its initially defined position D1, $\Delta L1$ is the thermal deformation of the ball screw 28A when the electrode K1 contacts with the pin KW1. W1 and W2 are the distances from the upper surface of the work table to the top of the pins KW2 and KW2, respectively.

The obtained thermal deformations of the Z-axis ball screw, the head part and the column part are stored in the memory 48.

The inferring section 42 carries out a learning process using data stored in the memory 40 and the memory 48, as follows.

The local controller 50 instructs the memory 40 to supply signals, indicative of a set of the detected temperatures, to the input layers of neural networks of the inferring section 42. The local controller 50 also instructs the memory 48 to supply signals indicative of the thermal deformations associated with the set of the detected temperatures input to the output layers of neural networks of the inferring section 42. Then, the local controller 50 instructs the inferring section 42 to "start learning" by making the appropriate associations. The inferring section 42 compares output signals of the output layers to teaching signals, i.e., the signals from the memory 48 and corrects bonding strengths between neurons so that the output signals of the output layers will agree with the teaching signals. In the same manner, the local controller 50 controls the memory 40, the memory 48, and the inferring section 42 for further learning.

After the teaching of the neural networks is completed, the inferring section 42 is able to infer the thermal deformations of machine components using the neural networks having corrected, i.e., learned, bonding strengths between neurons.

Figure 4A:
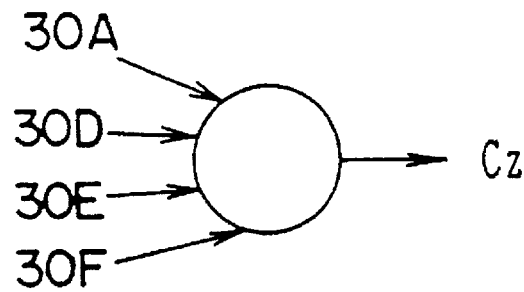
FIGS. 4(A), 4(B), 4(C), 4(D), 4(E) and 4(F) are diagrams illustrating various input(s) and an output for each of the various neural networks as examples of such networks which can be used in the inferring section shown in FIG. 1.
Figure 4B:
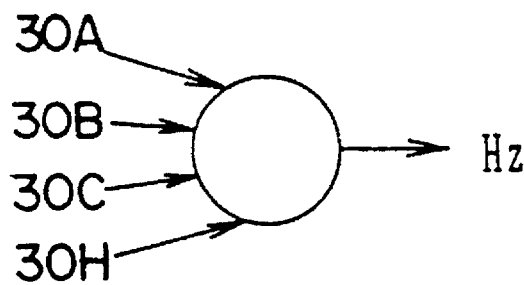
Figure 4C:
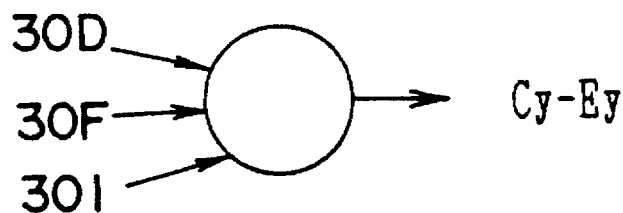
Figure 4D:
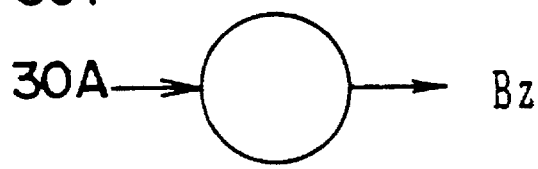
Figure 4E:
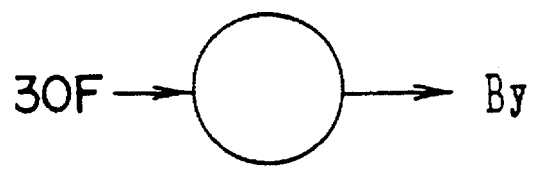
Figure 4F:
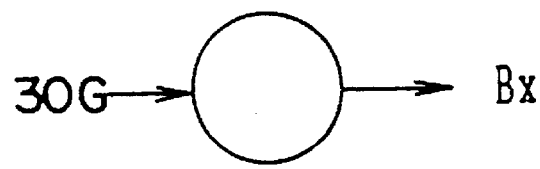

FIGS. 4(A)–4(F) illustrate exemplary input(s) and an output of each of neural networks for inferring thermal deformations of machine components. FIG. 4(A) illustrates the thermal deformation of a column part in the Z-axis direction, Cz, being inferred based on the temperatures sensed by thermosensors 30A, 30D, 30E and 30F. FIG. 4(B) illustrates the thermal deformation of a head part in the Z-axis direction, Hz, being inferred based on the temperatures sensed by thermosensors 30A, 30B, 30C and 30H. FIG. 4(C) illustrates the thermal deformations of the ram 18 and the bed 10 in the Y-axis direction, Cy–Ey, being inferred based on the temperatures sensed by thermosensors 30D, 30F and 30I. FIG. 4(D) illustrates the thermal deformation, Bz, of the Z-axis ball screw being inferred based on the temperature sensed by the thermosensor 30A. FIG. 4(E) illustrates the thermal deformation, By, of the Y-axis ball screw being inferred based on the temperature sensed by the thermosensor 30F. FIG. 4(F) illustrates the thermal deformation, Bx, of the X-axis ball screw being inferred based on the temperature sensed by the thermosensor 30G.

During machining, the thermosensors 30A–30I sense temperatures and generate data which is provided to the temperature detector 38, which in turn outputs digital signals, indicative of the temperatures, to the memory 40. The local controller 50 supplies instruction signals to memories 40 and 48 and the inferring section 42 at given time intervals. Responsive to instruction signals from the local controller 50, the memory 40 provides temperature signals based on which the inferring section 42 infers thermal deformations of machine components using the neural network with the bonding strengths between neurons, corrected as described above.

As shown in FIG. 1, the inferred thermal deformations of machine components are provided to the correction value calculator 52, which calculates the X-, Y- and Z-axes correction values in view of the calculated thermal deformations.

Figure 5A:
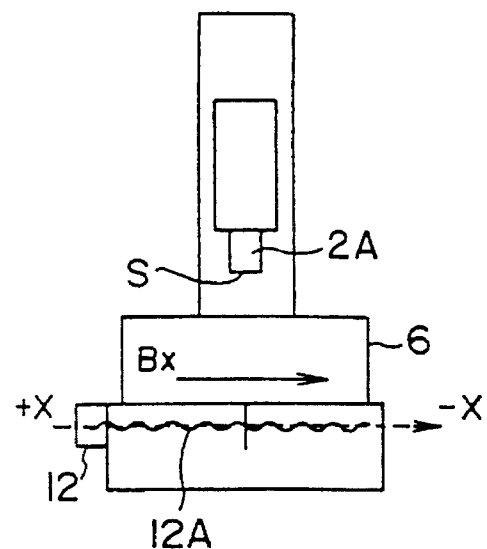
FIGS. 5(A), 5(B) and 5(C) are schematic illustrations of side views of the machine body of FIG. 1, indicating various axes movement.

FIG. 5(A) illustrates an error, due to thermal deformation, in positioning a tool along the X-axis. The tool is mounted on a tool holder (not illustrated), which is held by a holder chuck 2A at the position S. This error is the result of a thermal deformation (Bx) of the X-axis ball screw 12A.

Figure 5B:
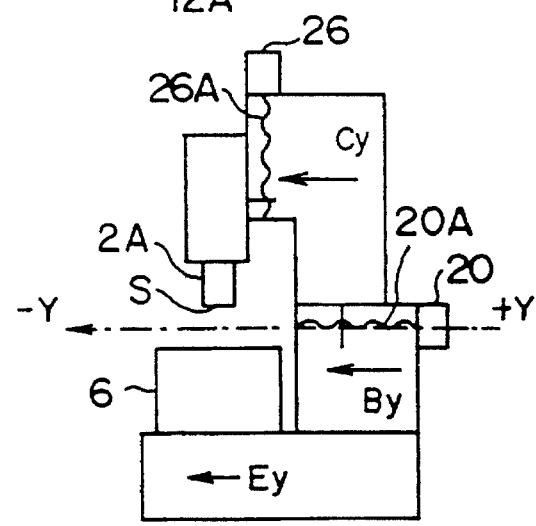

FIG. 5(B) illustrates an error, due to thermal deformations, in positioning the tool along a Y axis. The positioning error is the result of cumulative thermal deformations of the Y-axis ball screw 20A (By), of the ram 18 (Cy), and of the bed 10 (Ey).

Figure 5C:
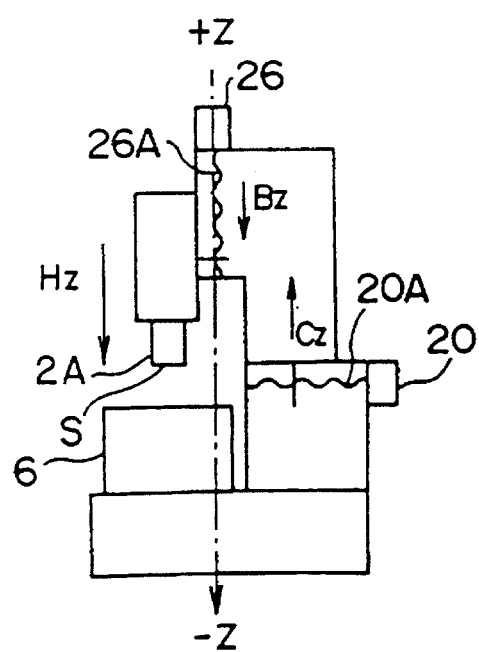

FIG. 5(C) illustrates an error due to thermal deformations in positioning the tool along a Z axis. This error is a consequence of cumulative thermal deformations of the Z-axis ball screw 26A (Bz), of the head part (Hz), and of the ram 18 and the column 16 (Cz).

For the situation illustrated in FIGS. 5(A), 5(B) and 5(C), correction values in the X-, Y- and Z-axes directions may be obtained using the following relationships:

X-axis correction value=−(Bx)

Y-axis correction value=−(By+Cy+Ey)

Z-axis correction value=−(Bz+Hz−Cz)

In this case, the correction value calculator 52 provides correction signals X4, Y4 and Z4 (see FIG. 1), which, respectively, represent the X-axis, Y-axis and Z-axis correction values input to the numerical controller 44. In this example, the numerical controller 44 combines the drive signals X2, Y2 and Z2 and the correction signals X4, Y4 and Z4, respectively, to correct positioning errors along X-, Y- and Z-axes due to the above described thermal deformations.

Since the neural network may process temperature data sensed at various machine components, and preferably all major machine components which may have an effect on positioning accuracy due to thermal deformations, the thermal deformations of those machine components which affect the deformations of other machine components in a complicated way may be accurately learned in order to correct positioning errors due to thermal deformations of such machine components.

In FIGS. 6–9, measured thermal deformations and inferred thermal deformations are plotted. The horizontal axis of the graphs denotes the number of temperature measurements which are taken every two minutes.

Figure 6:
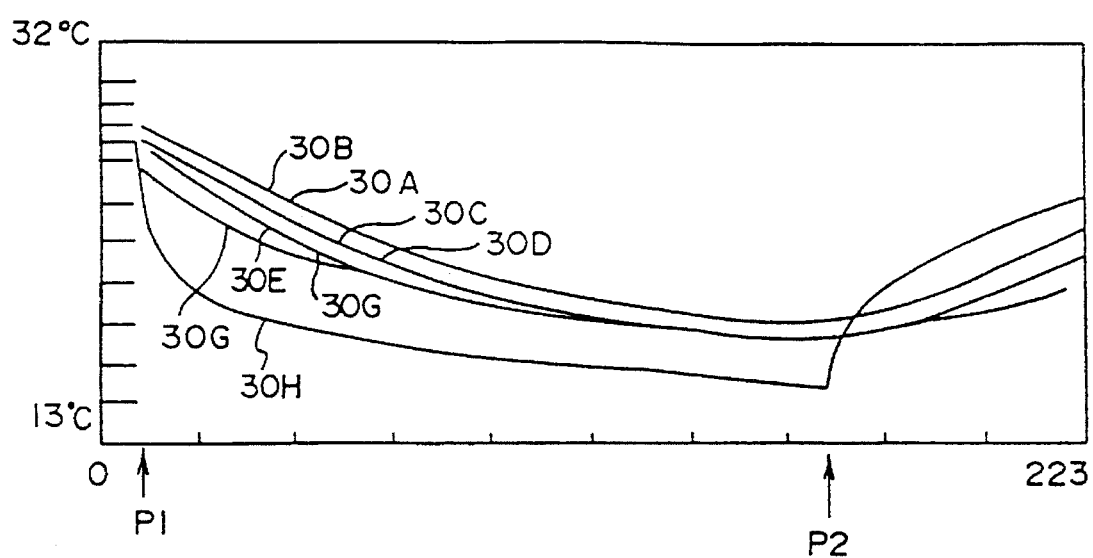
FIG. 6 is a graph in which temperatures sensed by thermosensors are plotted as a function of time.

FIG. 6 is a graph in which temperatures sensed by thermosensors 30A–30H are plotted. To start, the room temperature in which the machine is housed is maintained at about 28° C. using an appropriate heater. At time P1, the heater is turned off and a cooler is turned on to reduce the room temperature. Then, at time P2, when the room temperature drops to about 13° C., the cooler is turned off and the heater is turned on again to increase the room temperature.

The graph of FIG. 6 illustrates that the temperature sensed by the thermosensor 30H, which is located a little above the upper part of work tank 6, follows changes in the room temperature quite closely. Further, the temperatures sensed by the thermosensors 30E, 30F and 30G are found to lag somewhat behind the changes in the room temperature, and the temperatures sensed by the thermosensors 30A, 30B, 30C and 30D are found to lag considerably behind the changes in the room temperature.

Figure 7:
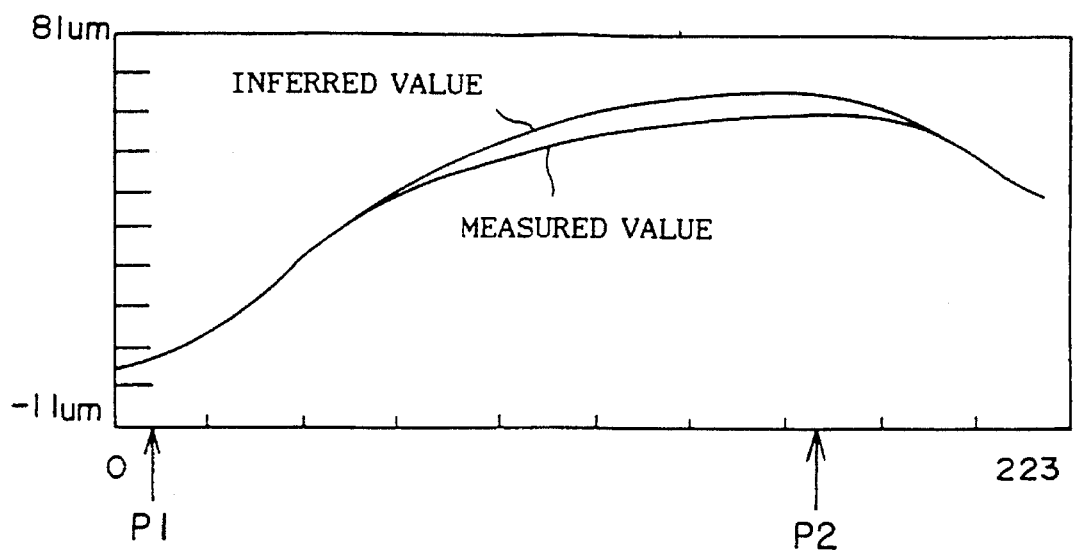
FIG. 7 is a graph comparing an inferred value of thermal deformation of a column member to the measured value.

In FIG. 7, measured thermal deformation of the column in the direction of a Z-axis and the thermal deformation thereof inferred by the neural network 42 are plotted.

Figure 8:
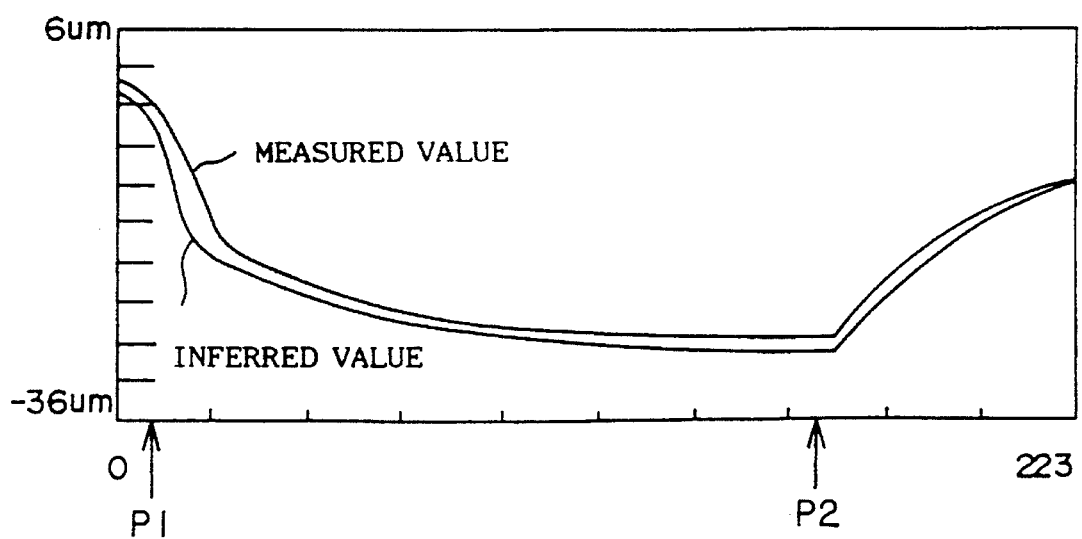
FIG. 8 is a graph comparing an inferred value of thermal deformation of a head member to the measured value.

In FIG. 8, measured thermal deformation of the head in the direction of a Z-axis and the thermal deformation thereof inferred by the neural network 42 are plotted.

Both FIGS. 7 and 8 show that although the measured, inferred thermal deformation values slightly deviate from each other in parts, the two values are in substantial agreement.

Figure 9:
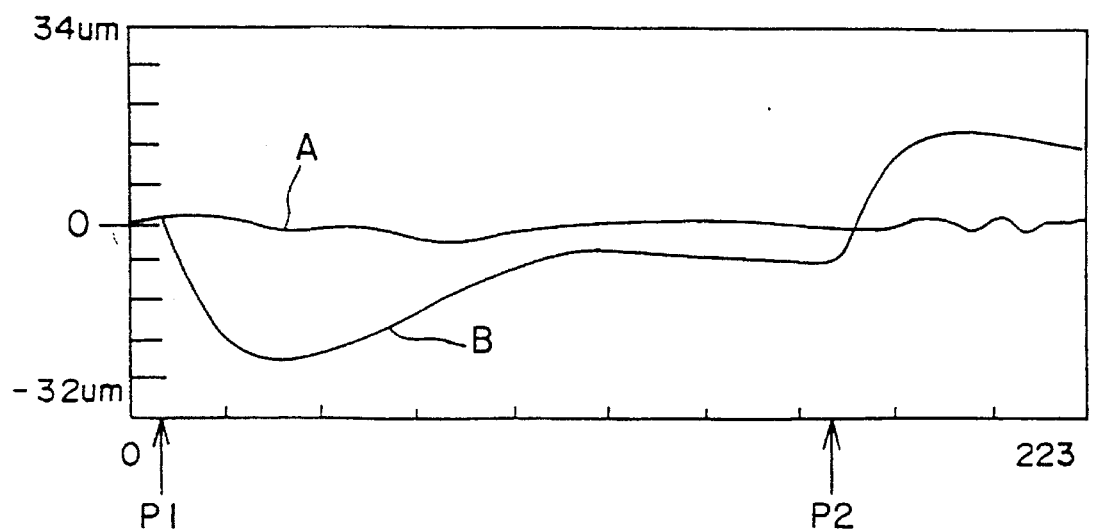
FIG. 9 is a graph comparing a corrected positioning error (along the Z-axis) to an uncorrected one.

In FIG. 9, graph A illustrates a positioning error along Z-axis with the corrective action of the present invention, and graph B illustrates a positioning error along Z-axis without the corrective action of the present invention. Though the positioning error due to thermal deformations fluctuates widely (graph B), it becomes more or less constant when it is corrected (graph A). The points labelled P1 and P2 in FIG. 9 correspond to the similarly labelled points in FIG. 6.

As will be appreciated by the artisan, error signals X3, Y3 and Z3 from the numerical controller 44 may be directly supplied to and stored in the memory 48, thereby removing the need for the thermal deformation calculator 46. In this case, positioning errors along X-, Y- and Z-axes may be measured using a laser measuring device. The error signals stored in the memory 48 are used as teaching signals, used by the inferring section 42 to adaptively change the bonding strength between neurons.

Figure 11A:
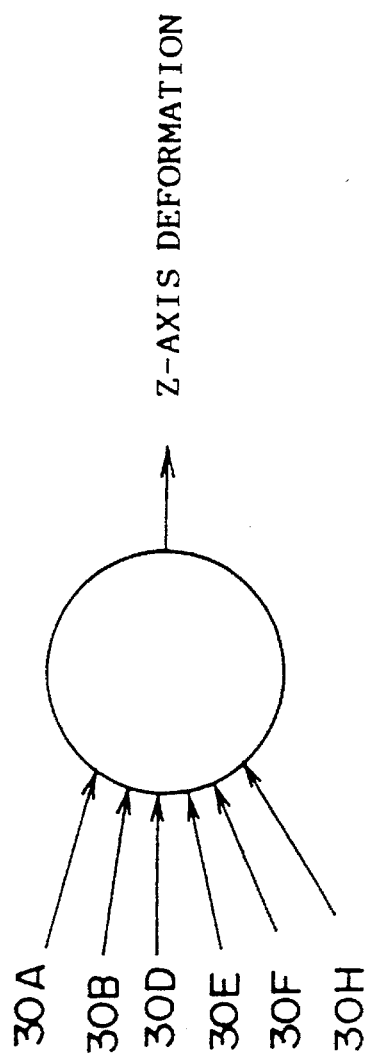
FIGS. 11(A), 11(B) and 11(C) are diagrams illustrating inputs and an output of each of the various exemplary neural networks of another inferring section.
Figure 11B:
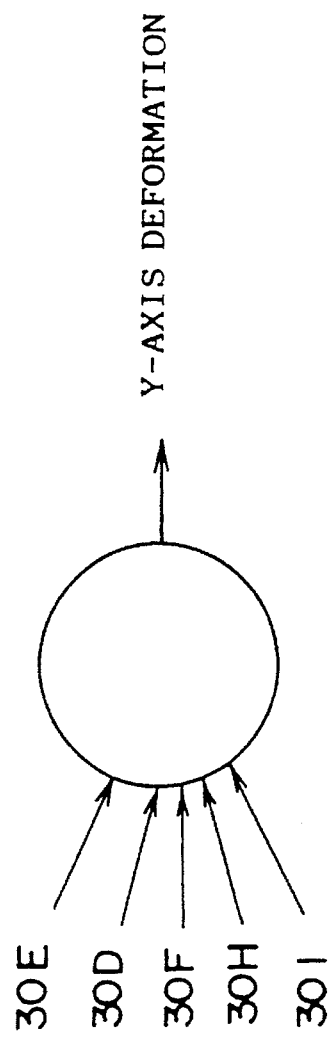
Figure 11C:
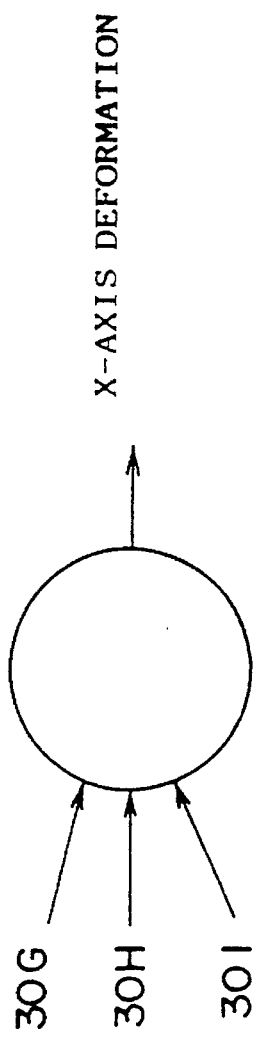

FIGS. 11(A)–11(C) illustrate exemplary inputs and an output of each of neural networks for inferring positioning errors along X-, Y- and Z-axes.

FIG. 11(A) illustrates that a positioning error in the Z-axis direction may, in the illustrated embodiment, be inferred based on the temperatures sensed by thermosensors 30A, 30B, 30D, 30E, 3OF and 30H.

FIG. 11(B) illustrates that a positioning error in the Y-axis direction may, in the illustrated embodiment, be inferred based an the temperatures sensed by thermosensors 30E, 30D, 30F, 30H and 30I.

FIG. 11(C) illustrates that a positioning error in the X-axis direction may, in the illustrated embodiment, be inferred based on the temperatures sensed by thermosensors 30G, 30H and 30I. The inferring section 42 supplies signals indicative of the inferred positioning errors to the correction value calculator 52. The correction value calculator 52 supplies signals indicative of correction values along X-, Y- and Z-axes for correcting positioning errors to the numerical controller 44.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, instead of using the nine thermosensors, more thermosensors may be used to infer thermal deformations more accurately, or less may be used where the accuracy requirements are less stringent. It is intended that the scope of the invention be defined by the claims appended hereto.

We claim:

1. A machine tool having a plurality of components subject to thermal deformation, for machining a workpiece using a tool member in which said tool member and workpiece are moveable relative to each other, said machine tool comprising:

a numerical controller for providing a drive signal to move said tool member relative to said workpiece along at least one axis of movement;

thermosensors for sensing temperatures of at least some of said plurality of components;

an inferring means for inferring thermal deformations of said components in the direction of said axis of movement, said inferring means including a plurality of neural networks having a number of neurons, each of said neural networks being adapted to receive temperature signals indicative of the sensed temperatures and to thereupon generate inferred values of thermal deformation of said components in the direction of said axis; and a correction value calculator, responsive to said inferred values of thermal deformation for providing a correction signal indicative of a correction value in the direction of said axis of movement; and wherein said numerical controller is operable to correct said drive signal by said correction signal to thereby correct any positioning error due to thermal deformation in the direction of said axis of movement.

2. The machine tool according to claim 1, further comprising a first memory for storing said temperature signals wherein said inferring means receives said temperature signals from said first memory.

3. The machine tool according to claim 2, further comprising a second memory for storing measured values of thermal deformations of said components, said measured value signals being used by said neural networks as temperature induced thermal deformation teaching signals.

4. The machine tool according to claim 1, wherein said numerical controller combines said drive signal and said correction signal.

5. The machine tool according to claim 1, wherein said machine tool comprises an electric discharge machine.

6. The machine tool according to claim 5, wherein said electric discharge machine includes a column and a ram member and a servo mechanism carried on said ram member, and wherein said tool member comprises a tool electrode mounted in and positioned by said servo mechanism.

7. A machine tool having a plurality of components subject to thermal deformation, for machining a workpiece using a tool member in which said tool member and workpiece are moveable relative to each other, said machine tool comprising:

a numerical controller for providing a drive signal to move said tool member relative to said workpiece along at least one axis of movement;

thermosensors provided at the different positions of said machine tool for sensing a plurality of temperatures at said positions of said machine tool;

an inferring means for inferring a positioning error of said tool member relative to said workpiece in the direction of said axis of movement, said inferring means including a neural network having a plurality of neurons, said neural network being operable to receive temperature signals indicative of the sensed temperatures and to thereupon generate a signal indicative of a positioning error in the direction of said axis of movement;

a correction value calculator, responsive to said positioning error signal, for providing a correction signal indicative of a correction value in the direction of said axis of movement; and wherein said numerical controller is operable to correct said drive signal using said correction signal to correct for positioning errors due to thermal deformation in the direction of said axis of movement.

8. The machine tool according to claim 7, wherein said numerical controller combines said drive signal and said correction signal.

9. The machine tool according to claim 7, wherein said machine tool comprises an electric discharge machine.

10. The machine tool according to claim 9, wherein said electric discharge machine includes a column and a ram member and a servo mechanism carried on said ram member, and wherein said tool member comprises a tool electrode mounted in and positioned by said servo mechanism.

11. A method of correcting for positioning errors between a workpiece and a tool member in a machine tool having a plurality of components subject to thermal deformation, wherein the tool member and workpiece are adapted to move relative to each other along at least one axis of movement under control of a drive signal from a numerical controller, said method comprising:

sensing the temperatures at a plurality of positions of said machine tool;

inputting the sensed temperatures to at least one neural network having a plurality of neurons;

inputting signals indicative of thermal deformation along said axis of movement associated with said sensed temperatures to said neural network to thereby preset bonding strengths between said neurons associating said sensed temperatures and said thermal deformations;

thereafter, inferring thermal deformations along said at least one axis based on said sensed temperatures and on said preset bonding strengths to thereby generate a thermal deformation correction value; and correcting positioning errors responsive to said thermal deformation correction value.

12. The method according to claim 11, wherein said tool member and workpiece are operable to move relative to each other along a plurality of axis of movement and the step of inputting sensed temperatures further comprises the step of inputting sensed temperatures to a plurality of neural networks, and the step of inputting signals indicative of thermal deformation values comprises inputting said signals for thermal deformations along each of said plurality of axis of movement, said neural networks being operable to generate thermal deformation correction values for each of said axis of movement.

13. The method according to claim 11, wherein the step of inputting sensed temperature further comprises a first step of inputting sensed temperatures in a thermally controlled environment and then measuring thermal deformations resulting from temperature changes to thereby generate said signals indicative of thermal deformation.

14. The method according to claim 13, wherein said step of inputting sensed temperatures further comprises a second step of inputting sensed temperatures during machining to thereby provide data for inferring thermal deformation values.

15. The method according to claim 14, wherein said step of inputting sensed temperatures during machining further comprises periodically inputting sensed temperatures.

16. The method according to claim 13, further comprising the step of periodically generating said signals indicative of thermal deformation by measuring actual thermal deformations associated with said temperature changes.

17. The method according to claim 16, further comprising the step of calculating components of said deformation based on temperature changes, machine tool component dimensions and measured position data.

18. The method according to claim 11, wherein the step of correcting further comprises the step of combining said drive signal and said thermal deformation correction value.

19. The method according to claim 11, wherein said steps of sensing the temperatures at a plurality of positions, inputting sensed temperatures to said at least one neural network, and inputting signals indicative of thermal deformations to said at least one neural network are repeated to thereby adaptively change the bonding strength between the neurons of said at least one neural network.

20. The method according to claim 11, wherein said machine tool comprises an electric discharge machine and said tool member comprises an electrode.

* * * * *